June 13, 1933.  G. A. SACHS  1,913,772

POULTRY FOUNTAIN

Filed Sept. 2, 1931   2 Sheets-Sheet 1

Inventor
G. A. Sachs
By C. A. Snow & Co.
Attorneys.

June 13, 1933.  G. A. SACHS  1,913,772
POULTRY FOUNTAIN
Filed Sept. 2, 1931  2 Sheets-Sheet 2
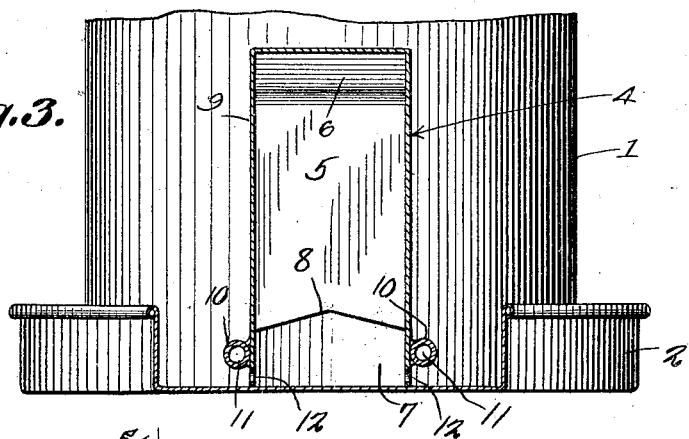
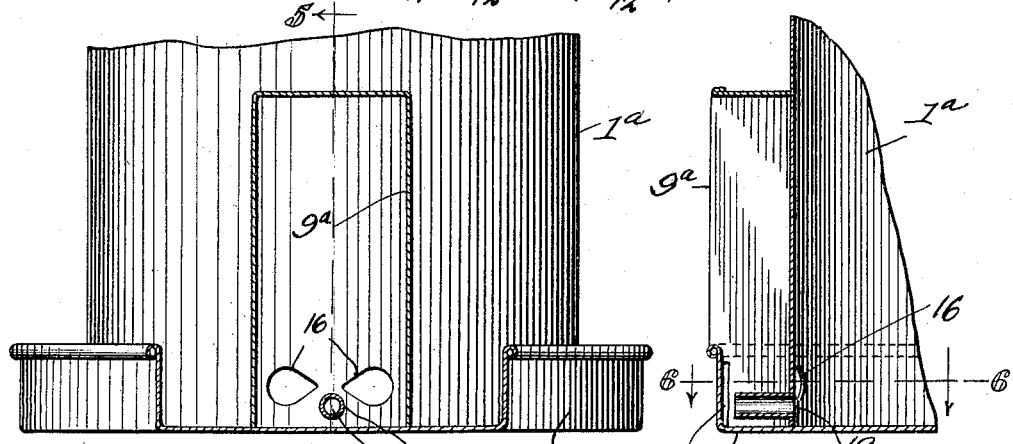
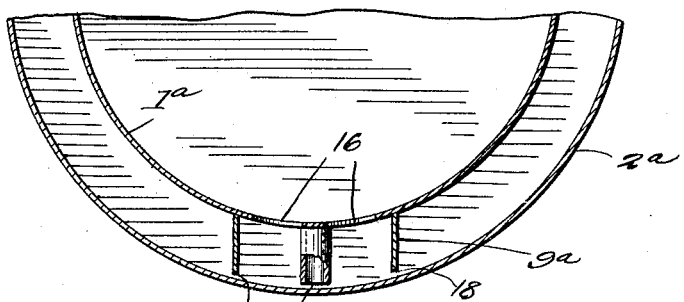
Inventor
G. A. Sachs
By C. A. Snow & Co.
Attorneys.

Patented June 13, 1933

1,913,772

UNITED STATES PATENT OFFICE

GEORGE A. SACHS, OF GETTYSBURG, PENNSYLVANIA

POULTRY FOUNTAIN

Application filed September 2, 1931. Serial No. 560,844.

This invention aims to provide a device constructed in such a way as to provide a large annular surface of water or other liquid, at a constant level, about a reservoir, without the use of floats, levers, valves, or other mechanical, moving parts, novel means being provided whereby the reservoir may be filled, and novel means being supplied whereby the water or other liquid can find its way from the reservoir into the trough which surrounds the reservoir.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 3 is a vertical section on the line 3—3 of Figure 2, parts being broken away;

Figure 4 is a section like Figure 3, but showing a modification;

Figure 5 is a section on the line 5—5 of Figure 4;

Figure 6 is a section on the line 6—6 of Figure 5.

Figure 1:
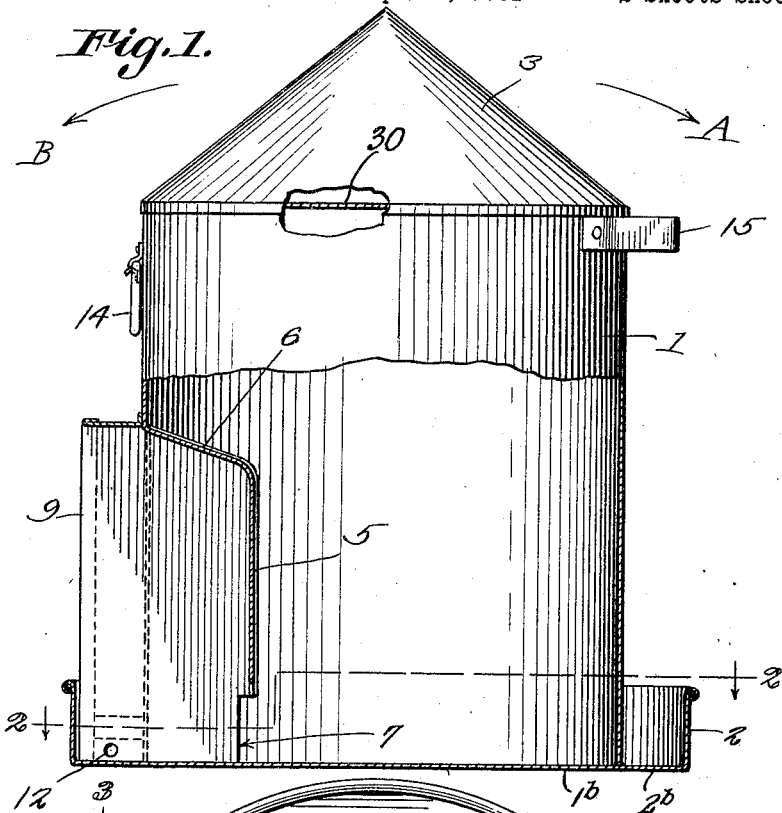
Figure 1 shows in vertical section, a device constructed in accordance with the invention, parts being left in elevation.

The device forming the subject matter of this application is made out of non-rusting metal, or any other suitable substance. It involves a vertical reservoir 1, which may be cylindrical in cross section, if desired. About the lower end of the reservoir 1 is disposed an annular trough 2, the bottom 1b of the reservoir 1 and the bottom 2b of the trough 2 being in the same plane. The reservoir 1 has a flat horizontal top 30, which is hermetically connected to the reservoir 1. On the upper end of the reservoir is mounted a conical cap 3, which prevents hens and other animals from roosting on the upper end of the device.

In the reservoir 1 there is a vertically elongated opening 4, indicated in Figure 3. A vertically elongated cup 5 is located in the reservoir 1, and is secured to the reservoir, about the opening 4. The cup 5 extends downwardly to the bottom of the reservoir 1. The top 6 of the cup 5 is downwardly and inwardly inclined, toward the bottom of the reservoir 1, for a purpose which will be described hereinafter. In the rear wall of the cup 5 there is an opening 7 which extends downwardly to the bottom of the reservoir 1. The upper edges of the opening 7 are upwardly inclined, to form an apex 8.

On the outside of the reservoir 1 there is an arched hood 9 which is secured to the reservoir 1, about the opening 4. The side walls of the hood 9 extend downwardly to the bottom of the trough 2 and are secured to the bottom of the trough. The side walls of the hood 9 extend backwardly to the side walls of the cup 5, and are joined thereto. The lower portions of the outer edges of the hood 9 are secured to the vertical, outer wall of the trough 2.

Figure 2:
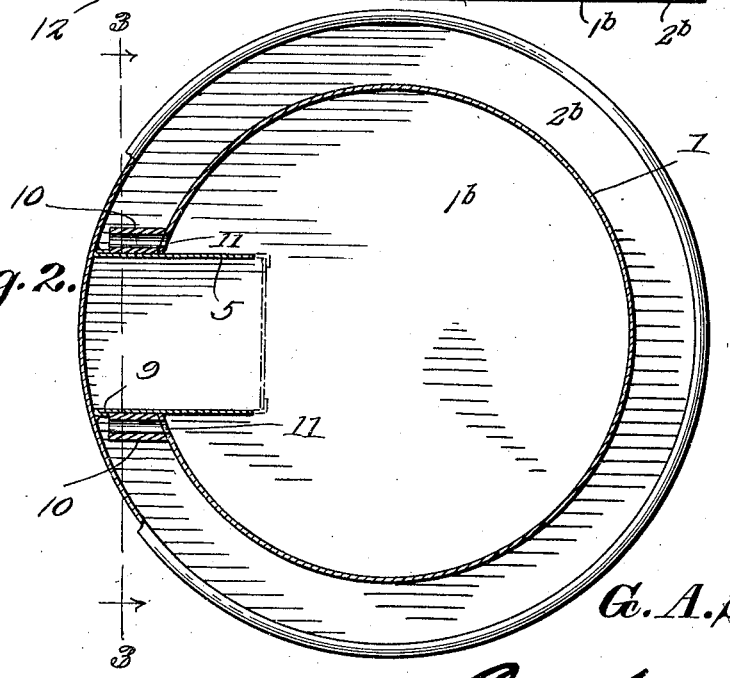
Figure 2 is a horizontal transverse section on the line 2—2 of Figure 1.

In the reservoir 1 there are holes 11, which are spaced vertically from the bottom of the reservoir 1, the said holes being located below the upper edge of the trough 2. Outwardly-extended, horizontal pipes 10 are secured at their inner ends to the reservoir 1, and these pipes may be secured to the sides of the hood 9. The pipes 10 are spaced vertically from the bottom of the trough 2, and the outer ends of the pipes are spaced from the vertical, outer wall of the trough 2, as shown in Figure 2. The holes 11 communicate with the pipes 10. In the side walls of the hood 9 there are apertures 12, that communicate with the trough 2.

Near to its upper end, the reservoir 1 is provided with a handle 14, which may be pivoted in place. The handle 14 is located directly above the hood 9. The reservoir 1 is supplied with an outstanding, rigid support 15, disposed diametrically opposite to the handle 14. The part 15 is called a support because it is one of the parts on which the reservoir 1 rests, when it is disposed in a horizontal position, as hereinafter described. The handle 14 and the support 15 may be used to carry the device about, in the vertical position of Figure 1, if the operator wishes to use both hands, or the device may be carried by the handle 14 alone.

In practical operation, one may take hold of the handle 14, and take hold of the vertical rim of the trough 2, within the hood 9, and turn over the device, in the direction of the arrow A in Figure 1, the article then being placed in a horizontal position on the floor, the article resting on the support 15 and on the part of the trough 2 which is immediately below the support in Figure 1 of the drawings.

With the device arranged in horizontal position, as above described, the cup 5 and the hood 9 form a hopper, into which the water or liquid may be poured. Because the part 6 of the top 5 is inclined, as hereinbefore explained, this element of the structure will tend to direct the water toward the opening 7, as the water is being poured into the hopper hereinbefore alluded to. The water flows from the cup 5 into the reservoir 1, through the opening 7, and the air escapes by way of the pipes 10, which form vents.

The device is restored to the vertical position of Figure 1, and the water will flow through the apertures 12, and through the holes 11 and the pipes 10, into the trough 2, filling the trough until the apex 8 of the opening 7 is covered. Because the lower edges of the rear wall of the cup 5 are upwardly inclined, to form the apex 8, the air will enter the reservoir 1, gradually, and not in large bubbles, the water or other liquid in the reservoir 1 being released gradually, so that it can flow into the trough 2, in the manner hereinbefore stated. When the reservoir 1 is turned over into a horizontal position, in the direction of the arrow B in Figure 1, to drain the reservoir, the pipes 10 come into play for another purpose, in that they permit all of the water to be drained out of angles formed by the wall of the reservoir 1 and the side walls of the cup 5, an observation which will be understood readily when Figure 2 of the drawings is noted.

It will be observed that the water can escape readily into the trough 2, a constant level being maintained in the trough, entirely around the reservoir 1, and a large surface of water or other liquid thus being exposed for use.

As to the form shown in Figures 4, 5 and 6 the article is made at the top like the one shown in Figure 1, if desired. Parts hereinbefore described have been designated by the numerals previously used, with the suffix "a". The large, elongated cup 5 of Figure 1 is dispensed with, and two openings 16 are formed in the reservoir 1a, within the hood 9a. These openings 16 may be seed-shaped, their upper edges forming an apex, like the apex 8 of Figure 3, and having the same function. There is an opening 19, through the wall of the reservoir 1a, within the hood 9a, and about the opening is secured a horizontal pipe 17 projecting within the hood 9a and within the trough 2a, the outer end of the pipe being spaced from the vertical rim of the trough. In the side wall of the hood 9a there are narrow vertical slits 18 which establish communication between the hood 9a and the trough 2a.

In order to fill the reservoir 1a, it is laid horizontally, as hereinbefore explained, the water or other liquid being poured into the hood 9a, the liquid entering the reservoir 1a through the openings 16. The pipe 17 and the opening 19, like the parts 10 and 11 of Figure 2, provide for the escape of air during the filling operation. When the article is set upright, as in Figures 4 and 5, the water or other liquid flows into the hood 9a, within the trough 2a, through the openings 16 and the pipe 17 until the openings 16 are covered. The water finds its way from the hood 9a into the trough 2a, through the slits 18.

The apparatus is especially adapted for furnishing a supply of drinking water or other liquid, to poultry and other animals.

Having thus described the invention, what is claimed is:—

1. In a device of the class described, a reservoir having an opening, a trough extended circumferentially of the reservoir, and a hood secured to the outside of the reservoir, about the opening, and extended downwardly into the trough, the hood being open on its outer side, for the admission of liquid, when the reservoir is horizontally disposed, there being an opening in the side wall of the hood, the last specified opening communicating with the trough and with the hood.

2. In a device of the class described, a reservoir having an opening, a trough extended circumferentially of the reservoir, a hood secured to the outside of the reservoir, about the opening, and extended downwardly into the trough, the hood being open on its outer side, for the admission of liquid, when the reservoir is horizontally disposed, means for delivering water from the reservoir to the trough, and a substantially horizontal vent pipe communicating at its inner end with the reservoir, and communicating at its outer end with the trough, externally of the hood.

3. In a device of the class described, a reservoir having an opening, a trough extended circumferentially of the reservoir, a hood secured to the outside of the reservoir, about the opening, and extended downwardly into the trough, the hood being open on its outer side, for the admission of liquid, when the reservoir is horizontally disposed, and means for delivering water from the reservoir to the trough, the reservoir being provided with an air vent hole, located closely adjacent to the hood, the vent hole communicating with the trough, externally of the hood.

4. In a device of the class described, a reservoir having an opening, a trough extended circumferentially of the reservoir, a hood secured to the outside of the reservoir, about the opening, and extended downwardly into the trough, the hood being open on its outer side, for the admission of liquid, when the reservoir is horizontally disposed, means for delivering water from the reservoir to the trough, and a substantially horizontal vent pipe communicating at its inner end with the reservoir, and communicating at its outer end with the trough, the vent pipe being located externally of the hood, and being secured to one side wall of the hood.

5. In a device of the class described, a reservoir having an opening, the upper edges of the opening converging and slanting upwardly, to form an apex, a trough extended circumferentially of the reservoir, a hood secured to the outside of the reservoir, about the opening, and extended downwardly into the trough, the hood being open on its outer side, for the admission of liquid, when the reservoir is horizontally disposed, and means for delivering water from the reservoir into the trough, the said converging edges of the opening, and the apex, permitting the air to enter the reservoir gradually.

6. In a device of the class described, a reservoir, a trough extended circumferentially of the reservoir, a hood secured to the outside of the reservoir and extended downwardly into the trough, the hood being open on its outer side for the reception of liquid when the reservoir is horizontally disposed, a cup located completely within the reservoir and secured to the reservoir, the reservoir having an opening of substantially the same size as the hood and the cup, the opening establishing communication between the hood and the cup, the cup having an opening communicating with the reservoir and located closely adjacent to the lower end of the reservoir, and means for delivering water from the reservoir to the trough by way of the last specified opening, the cup, and the hood, when the reservoir is vertically disposed.

In testimony that I claim the foregoing as my own, I have hereto affixed my signature.

GEORGE A. SACHS.